Patented Nov. 15, 1949

2,488,076

UNITED STATES PATENT OFFICE 2,488,076

POLYAZO-DYESTUFFS

Werner Bossard, Basel, Switzerland, assignor to J. R. Geigy A. G., Basel, Switzerland, a Swiss firm No Drawing. Application March 27, 1945, Serial No. 585,188. In Switzerland May 25, 1944

5 Claims. (Cl. 260—144)

It has been found that new valuable polyazo dyestuffs are obtained by converting primary disazo dyestuffs of the general formula

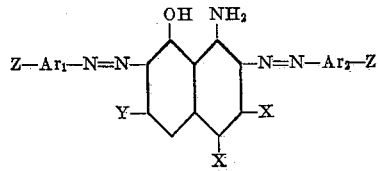

wherein one X means a sulfonic acid group and the other X means hydrogen, Y means a sulfonic acid group or hydrogen and $Ar_1$ and $Ar_2$ represent aromatic radicals, which contain at least one group forming metal-complex compounds and each of which contains a radical Z which is capable of conversion into a diazotisable amino group, into diamino-disazo dyestuffs, tetrazotising the same and combining the resulting tetrazonium compounds with two molecules of the same or different end components which are capable of coupling once and contain hydroxyl groups and which may also contain azo groups.

The same dyestuffs may also be prepared by first converting into an amino group one of the radicals Z which are present in the primary disazo dyestuffs of the above formula, in which one Z means a nitro group and the other Z represents an acylamino group, diazotising the obtained amino group, coupling the resulting diazo-disazo compound with one of the above-defined final components and subsequently converting the other radical Z into the amino group, carrying out a further diazotation and combining the so-obtained diazonium compound with the same or with another defined end component.

As metal-complex forming group in ortho-position to the azo group or to Z in the above formula may be mentioned: carboxyl groups, alkoxy groups, which may also be substituted, or hydroxyl groups.

As end components containing hydroxyl groups and being capable of coupling only once may be used: derivatives of β-ketocarboxylic acid esters, like 1-phenyl-3-alkyl-, -aryl- or -carboxy-5-pyrazolones, or β-ketocarboxylic acid anilides and their substitution products, salicylic acids and their homologues which are capable of coupling, 1- or 2-hydroxynaphthalene and substitution compounds thereof coupling once, such as hydroxynaphthalene sulfonic acids or hydroxynaphthalene carboxylic acids, amino-hydroxynaphthalene sulfonic acids and their derivatives acylated, alkylated or arylated at the nitrogen atom or monoazo dyestuffs which are capable of coupling, such as are obtained for instance by acid coupling of diazonium compounds with amino-hydroxynaphthalene mono- or -disulfonic acids.

The dyestuffs obtainable according to this process dye cellulosic fibres such as cotton, linen, ramie, hemp or jute, and fibrous substances from regenerated cellulose, such as staple fibre or rayon, when applied thereonto according to the usual methods for dyestuffs having direct affinity to these fibres, in greenish to reddish-grey shades. On after-treating the fibres, after the dyeing, with a metal-yielding agent especially valuable dyeings of good fastness to washing are obtained. The said after-treatment can be carried out in the dye-bath or in a new bath by means of copper salts, such as copper sulfate or copper acetate, in a neutral or slightly acid medium. If desired, it is also possible to use copper compounds which are stable to alkalis, such as are obtained for example by interaction of copper sulfate with sodium tartrate in a soda-alkaline bath.

Dyeings having also excellent fastness properties to washing may be obtained by after-treating the dyeings according to usual methods, instead of with the said copper compounds, with other metal-yielding agents, such as for example with chrome, cobalt, manganese or nickel salts. Instead of a single metal-yielding agent, it is advantageous to use for the after-treatment mixtures of two or several of the above-mentioned heavy metal salts.

When after-treating the dyeings with metal-yielding agents, the shades thereof are only immaterially changed, but considerably improved with respect to the fastness properties to washing and to light.

The dyestuffs claimed herein can, if desired, be converted into the copper complex compound also in substance according to known methods in an acid, neutral or ammoniacal bath by means of copper-yielding agents. With respect thereto it is also possible to treat dyestuffs which are twice metallisable only with one molecule of a copper-yielding agent, to use the incompletely coppered compounds for the dyeing and to after-treat the dyeings with an agent yielding copper or another metal.

The invention is now described by way of the following examples, without being limited thereto; the parts are by weight.

Example 1

The diazo compound from 19.4 parts of 2-acetylamino-5-aminobenzoic acid is coupled in a slightly mineral acid solution at room temperature with 31.9 parts of 1-amino-8-hydroxynaphthalene-4:6-disulfonic acid. The finished monoazo dyestuff is treated in a soda alkaline medium with a diazonium compound made from 18 parts of 4-acetylamino-2-amino-1-methoxybenzene. The resulting disazo dyestuff is precipitated, dissolved in hot water, saponified by heating with aqueous caustic soda lye and isolated with hydrochloric acid. Then it is dissolved in a sodium carbonate solution, mixed with 13.8 parts of sodium nitrite and, in the cold, 72 parts of concentrated hydrochloric acid is poured thereinto. After complete tetrazotation coupling is effected with 68.6 parts of 2-benzoylamino-8-hydroxynaphthalene-6-sulfonic acid in the presence of an excess of sodium carbonate and the dyestuff is finally isolated by means of sodium chloride.

For the purpose of coppering the obtained tetrakisazo dyestuff is dissolved in the required quantity of hot water and a solution of 50 parts of crystallised copper sulfate is added. The mixture is kept at its boiling temperature for a longer period and then the copper-containing dyestuff is isolated in the usual way. It is a dark powder which dyes cotton and regenerated cellulosic fibres, according to the methods used for dyestuffs having direct affinity to such fibres, in grey shades of good light-fastness.

Example 2

A solution of 31.9 parts of 1-amino-8-hydroxynaphthalene-3:6-disulfonic acid in 250 parts of water is allowed to run in the cold within 2 hours into a diazonium compound made from 18.2 parts of 5-nitro-2-aminobenzoic acid, 6.9 parts of sodium nitrite and 30 parts of concentrated hydrochloric acid. After completion of the formation of the monoazo dyestuff the mixture is made alkaline by means of an excess of sodium carbonate and combined with a diazonium compound obtained in the usual manner from 18 parts of 4-acetylamino-2-amino-1-methoxybenzene. The disazo dyestuff is salted out with a 10% sodium chloride solution, filtered off, dissolved in water and reduced with 11.7 parts of sodium sulfide. Then the aminoacetylaminodisazo dyestuff is precipitated with hydrochloric acid and filtered off. For the diazotation of the same it is dissolved with sodium carbonate, the resulting sulfur is filtered, the filtrate mixed with 6.9 parts of sodium nitrite and poured in the cold into 50 parts of concentrated hydrochloric acid. After formation of the diazonium compound it is coupled with 18.8 parts of 1-hydroxynaphthalene-2-carboxylic acid in the presence of an excess of sodium carbonate. The trisazo dyestuff thus separated is filtered and saponified by boiling the same with aqueous caustic soda lye. The aminotrisazo dyestuff isolated with hydrochloric acid is dissolved with sodium carbonate, treated with 6.9 parts of sodium nitrite and diazotised by rapidly adding 50 parts of concentrated hydrochloric acid. The diazonium compound is coupled with a solution of 40.3 parts of the monoazo dyestuff, obtained by acid coupling diazotised 1-amino-4-hydroxybenzene-3-carboxylic acid with 2-amino-5-hydroxynaphthalene-7-sulfonic acid, and with 40 parts of sodium carbonate in 500 parts of water. The resulting pentakisazo dyestuff is filtered off and dried. It constitutes a dark powder dissolving in water and in concentrated sulfuric acid with a bluish-grey coloration and dyeing cellulosic fibres in neutral grey shades which, on after-treatment with copper salts, possess very good fastness properties in the moist state.

Example 3

51.2 parts of the monoazo dyestuff obtained as described in Example 2 in an acid solution from diazotised 5-nitro-2-aminobenzoic acid and 1-amino-8-hydroxynaphthalene-3:6-disulfonic acid are combined in the presence of an excess of sodium carbonate with the diazonium compound made in the usual way from 16.8 parts of 5-nitro-2-amino-1-methoxybenzene. The isolated disazo dyestuff is reduced at 35° with a solution of 23.5 parts of sodium sulfide and precipitated by means of hydrochloric acid. For the purpose of tetrazotation the obtained diaminodisazo dyestuff is dissolved in a sodium carbonate solution, the resulting sulfur is filtered, the filtrate mixed with 13.8 parts of sodium nitrite and, in the cold, 72 parts of concentrated hydrochloric acid are poured thereinto. The tetrazotation has completed after some hours.

Now, coupling is effected with 37.6 parts of 1-hydroxynaphthalene-2-carboxylic acid in the presence of 80 parts of sodium carbonate. After some time the precipitated tetrakisazo dyestuff is filtered off and dried. It forms a black powder dissolving in water with a greenish-grey coloration and in concentrated sulfuric acid with a blue coloration and dyeing fibres from natural or regenerated cellulose in grey shades which, on after-treatment with copper, chrome or cobalt salts, are considerably improved with regard to their fastness properties to washing and to water without impairing the shade.

Example 4

63.1 parts of the diaminodisazo dyestuff 5-nitro-2-aminobenzoic acid → H-acid ← 5-nitro-2-amino-1-methoxybenzene described in Example 3 and reduced are tetrazotised as described above and combined in the presence of 80 parts of sodium carbonate with 80.6 parts of the monoazo dyestuff made by acid coupling diazotised 1-amino-4-hydroxybenzene-3-carboxylic acid and 2-amino-5-hydroxynaphthalene-7-sulfonic acid. The hexakisazo dyestuff is rapidly formed. It is precipitated at 50° C. by means of sodium chloride, filtered off, washed with dilute brine and dried. It forms a blackish powder which dissolves in water with a violetish-grey coloration and in concentrated sulfuric acid with a greyish-green coloration. Fibres from regenerated or natural cellulose are dyed in neutral grey shades which, on after-treatment with copper, chrome or cobalt salts, are scarcely changed, but considerably improved with regard to their fastness properties in the moist state.

components, $Ar_1$ and $Ar_2$ each represents an aromatic radical of the benzene series bearing, in ortho-position to an azo group, at least one member of the group consisting of alkoxy and COOH, and X is a member of the group consisting of H and $SO_3H$, only one X being different from H, which dyestuffs are dark powders, dissolving in water with a blue to grey coloration and dyeing cellulosic fibres, when metallised, grey shades of excellent fastness properties.

Table

| | 1-amino-8-hydroxynaphthalene compound | Acid coupled diazonium compound of— | alkaline coupled diazonium compound of— | end component | shade of the after-coppered dyeing on cellulose fibres |
|---|---|---|---|---|---|
| 1 | 1-amino-8-hydroxynaphthalene-4:6-disulfonic acid. | 5-acetylamino-2-aminobenzoic acid. | 4-acetylamino-2-amino-1-methoxy-benzene. | 2-hydroxy naphthalene. | grey. |
| 2 | 1-amino-8-hydroxynaphthalene-3:6-disulfonic acid. | 5-nitro-2-aminobenzoic acid. | 5-nitro-2-amino-1-ethoxybenzene. | 2-benzoylamino-8-hydroxynaphthalene-6-sulfonic acid. | reddish grey. |
| 3 | ...do... | ...do... | 5-nitro-2-amino-benzoic acid. | 5-nitro-2-aminobenzoic acid → 2-amino-5-hydroxy-naphthalene-7-sulfonic acid (acid). | bluish grey. |
| 4 | ...do... | ...do... | 4-acetylamino-2-amino-1-methoxybenzene. | 1-hydroxynaphthalene-2-carboxylic acid+2-hydroxynaphthalene-6-sulfonic acid. | grey. |
| 5 | ...do... | 2-nitro-5-aminobenzoic acid. | 2-nitro-5-aminobenzoic acid. | 1-amino-4-hydroxybenzene-3-carboxylic acid → 2-amino-5-hydroxynaphthalene-7-sulfonic acid (acid). | Do. |
| 6 | ...do... | 4-nitro-1-aminobenzene. | 2-acetylamino-5-amino-1-methoxybenzene. | 2-phenylamino-5-hydroxynaphthalene-7-sulfonic acid. | violetish-grey. |
| 7 | 1-amino-8-hydroxynaphthalene-4:6-disulfonic acid. | 2-nitro-5-amino-1-methoxy-benzene. | 2-nitro-5-amino-1-methoxybenzene. | 2-hydroxynaphthalene-3-carboxylic acid. | grey. |
| 8 | ...do... | 2-nitro-5-amino-1-ethoxybenzene. | ...do... | ...do... | Do. |
| 9 | 1-amino-8-hydroxynaphthalene-3:6-disulfonic acid. | 2-nitro-5-amino-1-methoxybenzene. | 5-nitro-2-amino-1-methoxybenzene. | 2-hydroxynapthalene. | Do. |
| 10 | ...do... | 5-nitro-2-aminobenzoic acid. | 5-nitro-2-amino-1:4-dimethoxybenzene. | 2-hydroxynaphthalene-3-carboxylic acid. | Do. |
| 11 | ...do... | 2-nitro-5-aminobenzoic acid. | 5-nitro-2-aminobenzoic acid. | 1-amino-4-hydroxybenzene-3-carboxylic acid → 2-amino-5-hydroxynaphthalene-7-sulfonic acid (acid). | Do. |
| 12 | ...do... | 5-nitro-2-aminobenzoic acid. | 5-nitro-2-amino-1:4-diethoxybenzene. | ...do... | Do. |
| 13 | ...do... | 2-nitro-5-aminobenzoic acid. | 4-acetylamino-2-amino-1-methoxybenzene. | 2-benzoylamino-8-hydroxynaphthalene-6-sulfonic acid+1-hydroxynaphthalene-2-carboxylic acid. | reddish-grey. |
| 14 | | 5-nitro-2-aminobenzoic acid | 5-nitro-2-amino-1:4-diethoxybenzene | 2-phenyl-amino-8-hydroxy-naphthalene-6-sulfonic acid | grey. |
| 15 | | ...do... | 2-nitro-5-aminobenzoic acid | 2-benzoyl-amino-6-hydroxy-naphthalene-8-sulfonic acid | Do. |
| 16 | ...do... | ...do... | 5-nitro-2-amino-1-methoxy-benzene | 1-amino-benzene-3-sulfonic acid → 2-amino-5-hydroxy-naphthalene-7-sulfonic acid (acid) | violetish-grey. |
| 17 | ...do... | ...do... | ...do... | 1-benzoyl-amino-8-hydroxy-naphthalene-3:6-disulfonic acid | bluish-grey |
| 18 | ...do... | ...do... | ...do... | 5-nitro-2-amino-benzoic acid → 1-amino-8-hydroxy-naphthalene-3:6-disulfonic acid (acid) | Do. |
| 19 | ...do... | ...do... | 5-nitro-2-aminobenzoic acid | 1-hydroxy-napthalene-4-sulfonic acid | grey. |
| 20 | ...do... | ...do... | 5-nitro-2-amino-1-methoxybenzene-4-carboxylic acid | 2-benzoyl-amino-5-hydroxy-naphthalene-7-sulfonic acid | Do. |

What I claim is:

1. The polyazo dyestuffs which are capable of being metallised, corresponding in the free state to the general formula

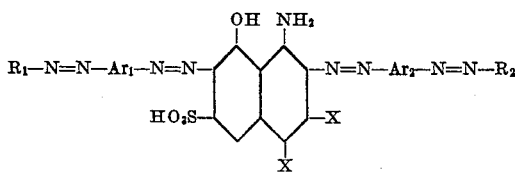

wherein $R_1$ and $R_2$ each represents a radical of a coupling component selected from the group consisting of α- and β-hydroxynaphthalene coupling 2. The polyazo dyestuffs which are capable of being metallised, corresponding in the free state to the general formula

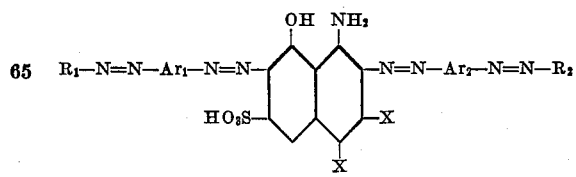

wherein $R_1$ and $R_2$ mean each a radical of a monoazo dyestuff consisting of an aminonaphtholsulfonic acid coupled in an acid medium with a diazo compound of the benzene series, $Ar_1$ and $Ar_2$ each represents an aromatic radical of the benzene series bearing, in ortho-position to an azo group, at least one member of the group consisting of alkoxy and COOH, and X is a member of the group consisting of H and SO₃H, only one X being different from H, which dyestuffs are dark powders, dissolving in water with a blue to grey coloration and dyeing cellulosic fibres, when metallised, grey shades of excellent fastness properties.

3. The polyazo dyestuff which is capable of being metallised, corresponding in the free state to the formula

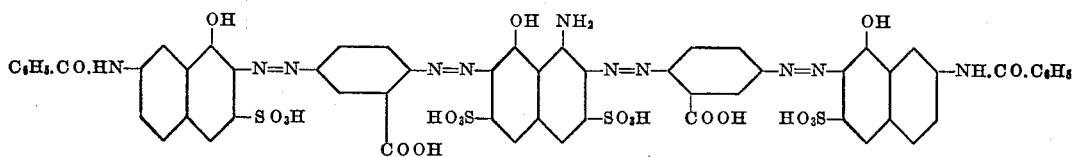

being a dark powder, dissolving in water with a violet-greyish coloration and dyeing cellulosic fibres, when metallised, grey shades of excellent fastness properties.

4. The polyazo dyestuff which is capable of being metallised, corresponding in the free state to the formula

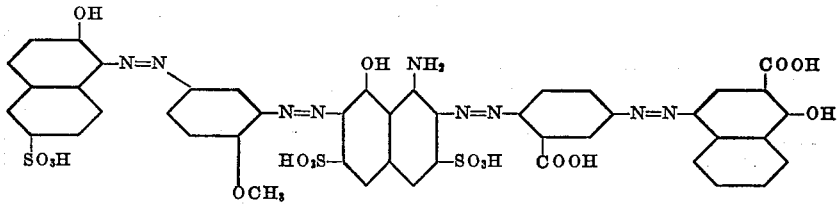

being a dark powder, dissolving in water with a bluish-grey coloration and dyeing cellulosic fibres, when metallised, grey shades of excellent fastness properties.

5. The polyazo dyestuff which is capable of being metallised, corresponding in the free state to the formula

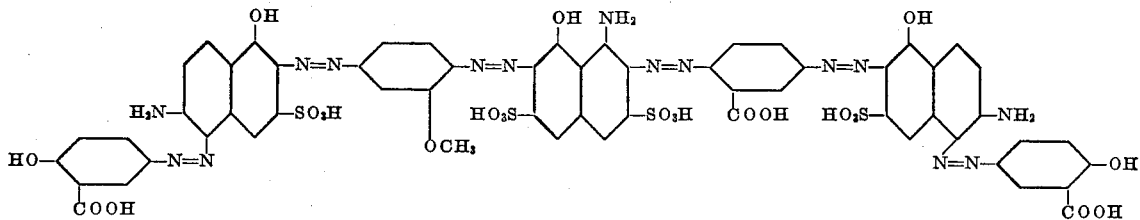

being a dark powder, dissolving in water with a bluish-grey coloration and dyeing cellulosic fibres, when metallised, grey shades of excellent fastness properties.

WERNER BOSSARD.

REFERENCES CITED

The following references are of record in the file of this patent:

UNITED STATES PATENTS

| Number | Name | Date |
|---|---|---|
| 1,363,886 | Leaming et al. | Dec. 28, 1920 |

FOREIGN PATENTS

| Number | Country | Date |
|---|---|---|
| 13,744 | Great Britain | 1896 |
| 18,977 | Great Britain | 1899 |
| 349,600 | Great Britain | May 26, 1931 |
| 363,955 | Great Britain | Dec. 31, 1931 |